United States Patent
Ishi

(10) Patent No.: US 8,699,311 B2
(45) Date of Patent: Apr. 15, 2014

(54) OPTICAL INFORMATION RECORDING/REPRODUCING APPARATUS, OPTICAL INFORMATION REPRODUCING APPARATUS, OPTICAL INFORMATION RECORDING/REPRODUCING METHOD AND OPTICAL INFORMATION REPRODUCING METHOD

(71) Applicant: Hitachi Consumer Electronics Co., Ltd., Tokyo (JP)

(72) Inventor: Toshiki Ishi, Yokohama (JP)

(73) Assignee: Hitachi Consumber Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/679,644

(22) Filed: Nov. 16, 2012

(65) Prior Publication Data
US 2013/0201808 A1      Aug. 8, 2013

(30) Foreign Application Priority Data
Nov. 18, 2011   (JP) ................................. 2011-252207

(51) Int. Cl.
    *G11B 7/0065*       (2006.01)
(52) U.S. Cl.
    USPC ...................................... 369/103; 369/47.49
(58) Field of Classification Search
    USPC ............................................. 369/47.49, 103
    See application file for complete search history.

(56) References Cited

U.S. PATENT DOCUMENTS

| | | | |
|---|---|---|---|
| 7,903,525 B2 * | 3/2011 | Koda et al. .................... | 369/103 |
| 2003/0076765 A1 * | 4/2003 | Ayres et al. .................... | 369/103 |

FOREIGN PATENT DOCUMENTS

JP        2004-272268 A       9/2004

* cited by examiner

*Primary Examiner* — Brenda Bernardi
(74) *Attorney, Agent, or Firm* — McDermott Will & Emery LLP

(57) ABSTRACT

An optical-information reproducing apparatus for reproducing information from an optical-information storage medium where an interference pattern between a signal beam and a reference beam is recorded as page data by being angle-multiplexed, the optical-information reproducing apparatus, including a light-source for emitting a light beam, an optical element for splitting the light beam into the reference beam and the signal beam, an angle-controlling element for controlling the reference beam into a direction which is perpendicular to the angle-multiplexed direction, the reference beam being guided to enter the optical-information storage medium, an optical detector for detecting a reproduced image which is reproduced by the reference beam, and a position-controlling circuit for controlling position relationship between the reference beam and the optical-information storage medium.

7 Claims, 15 Drawing Sheets

FIG. 6A
FIG. 6B
FIG. 6C
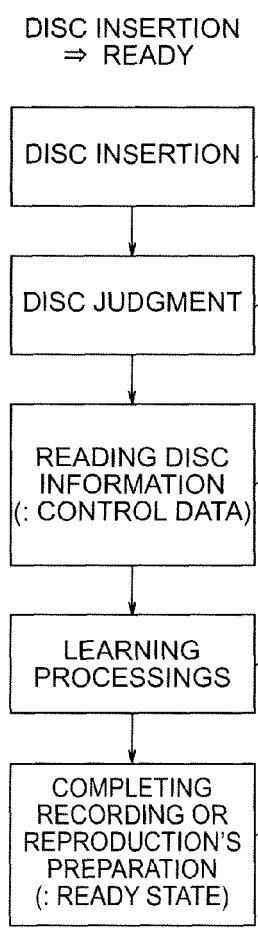
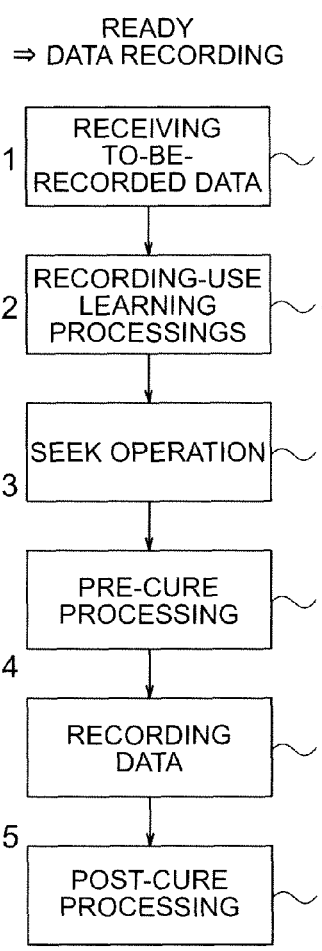
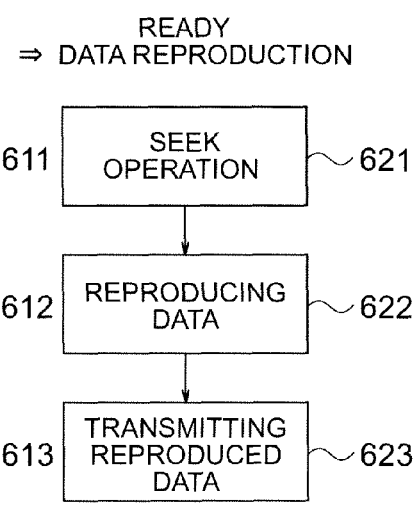

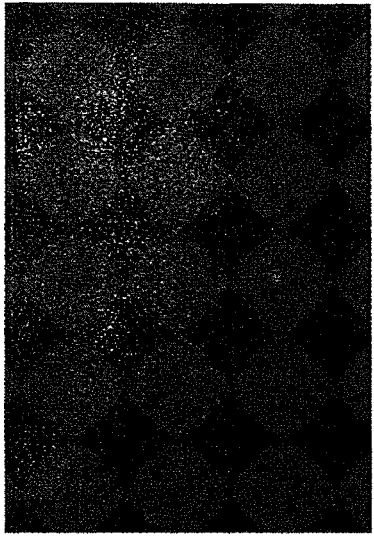

FIG. 11B

ANGLE SHIFT PERPENDICULAR TO ANGLE-MULTIPLEXED DIRECTION IS ABSENT, BUT ANGLE SHIFT IN ANGLE-MULTIPLEXED DIRECTION IS EQUAL TO 0. 1 DEGREE

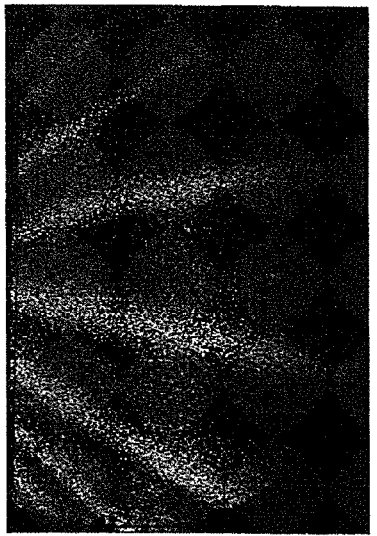

FIG. 11D

ANGLE SHIFT PERPENDICULAR TO ANGLE-MULTIPLEXED DIRECTION IS PRESENT, AND ANGLE SHIFT IN ANGLE-MULTIPLEXED DIRECTION IS EQUAL TO 0. 1 DEGREE

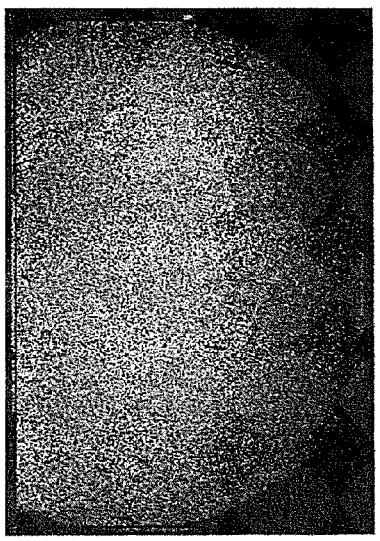

FIG. 11A

ANGLE SHIFT PERPENDICULAR TO ANGLE-MULTIPLEXED DIRECTION IS ABSENT, AND ANGLE SHIFT IN ANGLE-MULTIPLEXED DIRECTION IS ABSENT

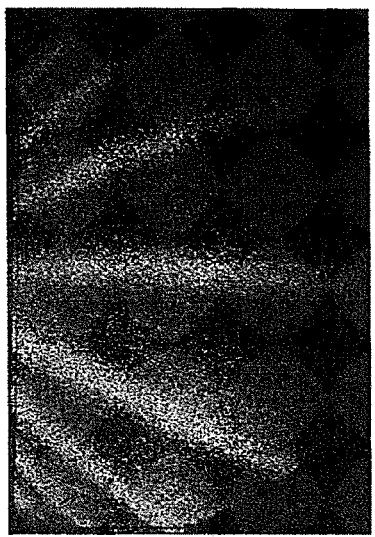

FIG. 11C

ANGLE SHIFT PERPENDICULAR TO ANGLE-MULTIPLEXED DIRECTION IS PRESENT, BUT ANGLE SHIFT IN ANGLE-MULTIPLEXED DIRECTION IS ABSENT

WHEN ANGLE SHIFT PERPENDICULAR
TO ANGLE-MULTIPLEXED DIRECTION
IS ABSENT

WHEN ANGLE SHIFT PERPENDICULAR
TO ANGLE-MULTIPLEXED DIRECTION
IS PRESENT

OPTICAL INFORMATION RECORDING/REPRODUCING APPARATUS, OPTICAL INFORMATION REPRODUCING APPARATUS, OPTICAL INFORMATION RECORDING/REPRODUCING METHOD AND OPTICAL INFORMATION REPRODUCING METHOD

INCORPORATION BY REFERENCE

The present application claims priority from Japanese application JP2011-252207 filed on Nov. 18, 2011, the content of which is hereby incorporated by reference into this application.

BACKGROUND OF THE INVENTION

The present invention relates to an apparatus and method for recording/reproducing information into/from a storage medium by taking advantage of holography.

At present, the Blu-ray Disc™ standard using the blue-violet semiconductor laser has made the about-50-GB-recording-density-equipped optical discs commercially available even in their consumer products. In the corning years, this large-capacity implementation of the optical discs is desired up to the same extent as that of the HDD (: Hard Disk Drive), i.e., 100 GB to 1 TB.

Implementing an ultra-high density like this using the optical discs, however, requires a high-density-implementing technology which is based on some new scheme, and which is different from the conventional high-density-implementing technology. Here, this conventional technology is based on the shorter-wavelength implementation and the objective lens' high-NA implementation.

Various researches about the next-generation storage technologies are underway at present. Of these technologies, attention is focused on the holographic recording technology for recording digital information by taking advantage of holography.

The holographic recording technology is the following technology: Namely, a signal beam is equipped with information on page data which is modulated in a two-dimensional manner by a spatial light modulator. Then, this signal beam is superimposed on a reference beam inside a storage medium. At this time, an interference-fringe pattern is formed as a result of this superimposition. Moreover, the information is recorded into the storage medium in such a manner that a refractive-index modulation is caused to occur inside the storage medium by this interference-fringe pattern.

At the time of reproducing the information, the storage medium is illuminated with the reference beam used at the time of recording the information. As a result, the hologram recorded into the storage medium operates like a diffraction grating, thereby generating a diffracted light. This diffracted light is reproduced as the same light, including the signal beam and phase information recorded.

The reproduced signal beam is detected in a two-dimensional manner at a high speed, using an optical detector such as CMOS or CCD. In this way, the holographic recording technology makes it possible to record two-dimensional information at one stroke into an optical storage medium using a single hologram. Moreover, this technology makes it possible to reproduce this two-dimensional information recorded. Furthermore, this technology makes it possible to overwrite plural pieces of page data at a certain location of the storage medium. These features allow accomplishment of large-capacity and high-speed recording/reproduction of information.

As the holographic recording technology, there exists, e.g., JP-A-2004-272268. In the present publication, the disclosure has been made concerning a technology for recoding the hologram in a manner of being multiplexed.

SUMMARY OF THE INVENTION

By the way, in the optical-information reproducing apparatus which takes advantage of the angle-multiplexing-scheme-based holography, there has existed the following problem: Namely, when reproducing the optical-information storage medium at least a partial storage area of which is recorded, there exists none of an effective method for judging whether or not the hologram is recorded at a predetermined location of the optical-information storage medium.

In view of this situation, an object of the present invention is to enhance the control speed in the recording or reproducing operation which takes advantage of the holography.

The above-described object is accomplished by, as its example, performing the reference beam's illumination in a direction which is perpendicular to the angle-multiplexed direction.

According to the present invention, it becomes possible to enhance the control speed in the recording or reproducing operation which takes advantage of the holography.

Other objects, features and advantages of the invention will become apparent from the following description of the embodiments of the invention taken in conjunction with accompanying drawings.

BRIEF DESCRIPTION OF THE DRAWINGS

FIGS. 6A-6C are schematic diagrams for illustrating an embodiment of the operation flows of the optical-information recording/reproducing apparatus.

FIGS. 11A-11D are diagrams for illustrating the relationship between the presence or absence of an angle shift of the reference beam at a location at which the angle-multiplexed recording is performed, and the reproduced image resulting therefrom.

DETAILED DESCRIPTION OF THE INVENTION

Figure 1:
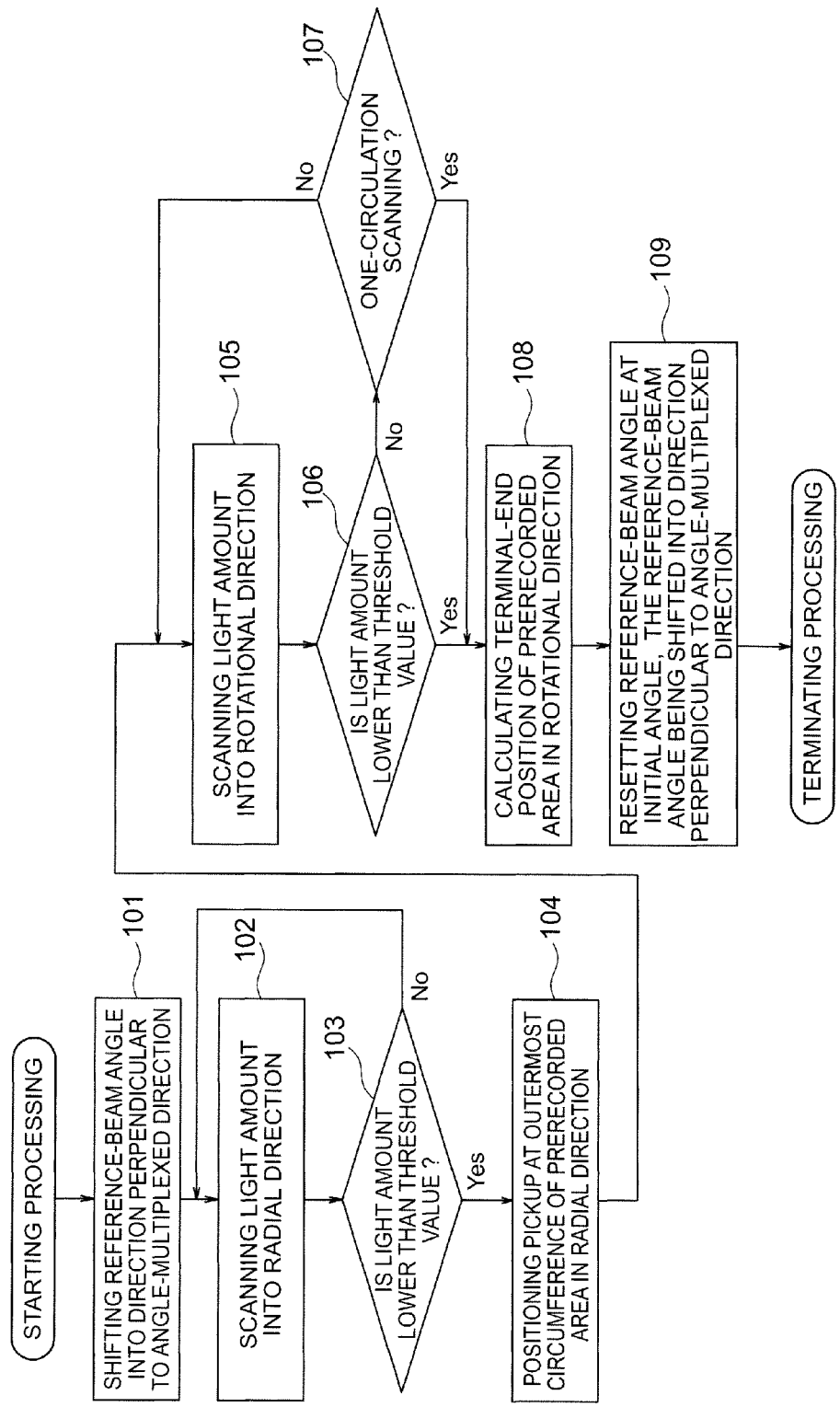
FIG. 1 is a diagram for indicating a flowchart for judging the boundary between a prerecorded area and an unrecorded area.

Hereinafter, referring to the drawings, the explanation will be given below concerning embodiments of the present invention.

Embodiment 1

Figure 2:
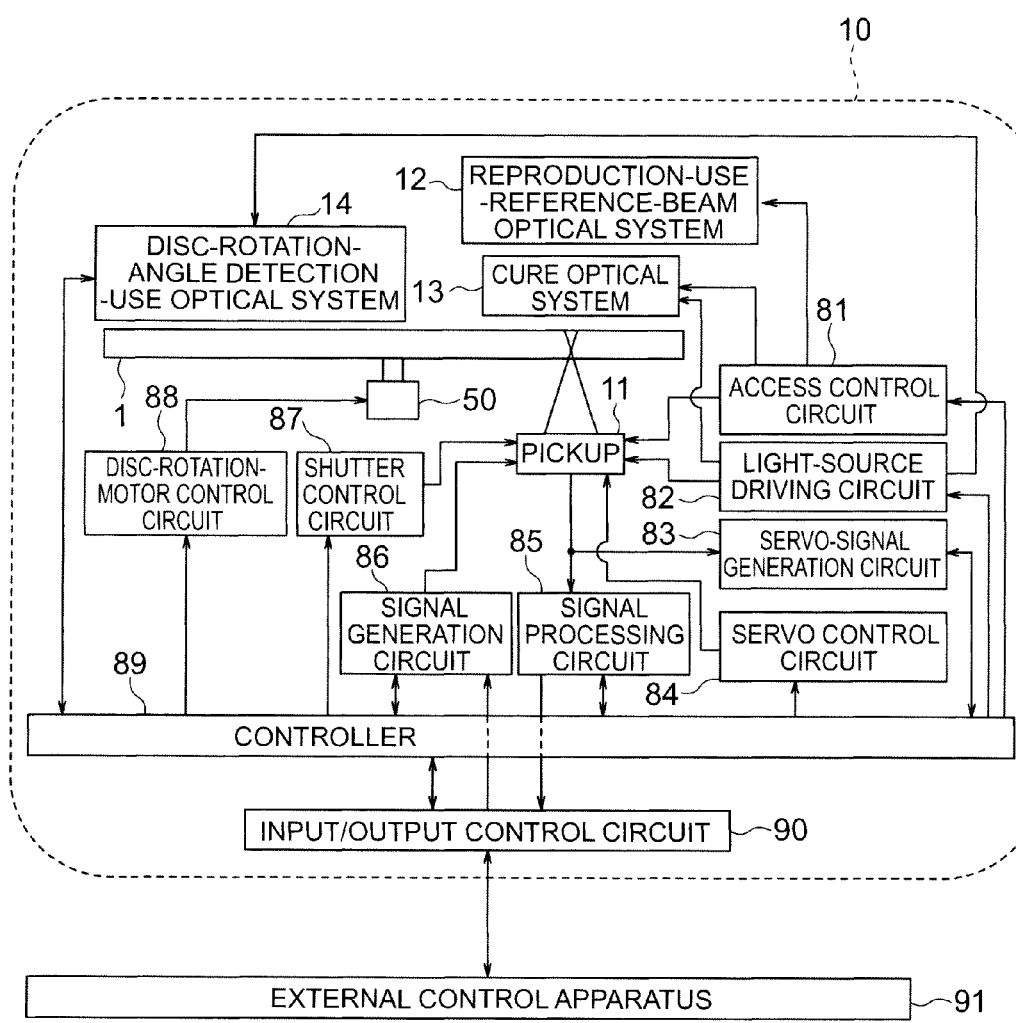
FIG. 2 is a schematic diagram for illustrating an embodiment of the optical-information recording/reproducing apparatus.

In accordance with the accompanying drawings, the explanation will be given below regarding an embodiment of the present invention. FIG. 2 is a block diagram for illustrating an optical-information recording/reproducing apparatus for an optical-information storage medium for recording and/or reproducing digital information by taking advantage of holography.

The optical-information recording/reproducing apparatus 10 is connected to an external control apparatus 91 via an input/output control circuit 90. When performing the recording, the optical-information recording/reproducing apparatus 10 receives an information signal to be recorded from the external control apparatus 91 via the input/output control circuit 90. When performing the reproduction, the optical-information recording/reproducing apparatus 10 transmits the reproduced information signal to the external control apparatus 91 via the input/output control circuit 90.

The optical-information recording/reproducing apparatus 10 includes a pickup 11, a reproduction-use-reference-beam optical system 12, a cure optical system 13, a disc-rotation-angle detection-use optical system 14, and a rotation motor 50. The optical-information storage medium 1 is so configured as to be made rotatable by the rotation motor 50.

The pickup 11 plays the following role: Namely, the pickup 11 records digital information into the optical-information storage medium 1 by emitting a reference beam and a signal beam to the storage medium 1, and by taking advantage of the holography. At this time, the information signal to be recorded is transmitted into a spatial light modulator inside the pickup 11 by a controller 89 via a signal generation circuit 86. The information signal beam is modulated by the spatial light modulator.

When reproducing the information recorded into the optical-information storage medium 1, the reproduction-use-reference-beam optical system 12 generates an optical wave for causing the reference beam, which is emitted from the pickup 11, to enter the optical-information storage medium 1 in the direction opposite to the one when the information is recorded. Moreover, a reproduced beam, which is reproduced by the reproduction-use reference beam, is detected by an optical detector inside the pickup 11, (which will be described later). Then, the signal is reproduced by a signal processing circuit 85.

The illumination time, during which the optical-information storage medium 1 is illuminated with the reference beam and the signal beam, can be adjusted as follows: Namely, the open/close time of a shutter inside the pickup 11 is controlled by the controller 89 via a shutter control circuit 87.

The cure optical system 13 plays a role of generating an optical beam which is used for the pre-cure and post-cure of the optical-information storage medium 1. The pre-cure is the following before-processing: Namely, when recording information at a desired position within the optical-information storage medium 1, before the desired position is illuminated with the reference beam and the signal beam, the desired position is illuminated with a predetermined optical beam in advance. The post-cure is the following after-processing: Namely, after the information has been recorded into the desired position within the optical-information storage medium 1, the desired position is illuminated with a predetermined optical beam in order to make it impossible to perform an additional recording therein.

The disc-rotation-angle detection-use optical system 14 is used for detecting the rotation angle of the optical-information storage medium 1. When adjusting the optical-information storage medium 1 at a predetermined rotation angle, a signal which corresponds to the rotation angle is detected using the disc-rotation-angle detection-use optical system 14. Subsequently, using the signal detected, the rotation angle of the optical-information storage medium 1 can be controlled by the controller 89 via a disc-rotation-motor control circuit 88.

A light-source driving circuit 82 supplies a predetermined light-source driving current to light sources set up inside the pickup 11, the cure optical system 13, and the disc-rotation-angle detection-use optical system 14. Each of the light sources can emit an optical beam with a predetermined light amount.

Also, the pickup 11 and the cure optical system 13 are equipped with a mechanism for allowing their positions to slide in the radial direction of the optical-information storage medium 1. This mechanism performs their position controls via an access control circuit 81.

By the way, in the recording technology which takes advantage of the principle of the holography-based angle-multiplexing recording, the following tendency exists: Namely, the tolerable error for a shift of the reference-beam angle becomes exceedingly small.

Accordingly, the following countermeasures become necessary: Namely, a mechanism for detecting the shift amount of the reference-beam angle is set up inside the pickup 11. Moreover, a servo-control-use signal is generated in a servo-signal generation circuit 83. Furthermore, a servo mechanism for correcting the shift amount is set up inside the optical-information recording/reproducing apparatus 10 via a servo control circuit 84.

Also, the pickup 11, the cure optical system 13, and the disc-rotation-angle detection-use optical system 14 may be simplified by integrating some of their optical configurations, or all of their optical configurations into a single configuration.

Figure 3:
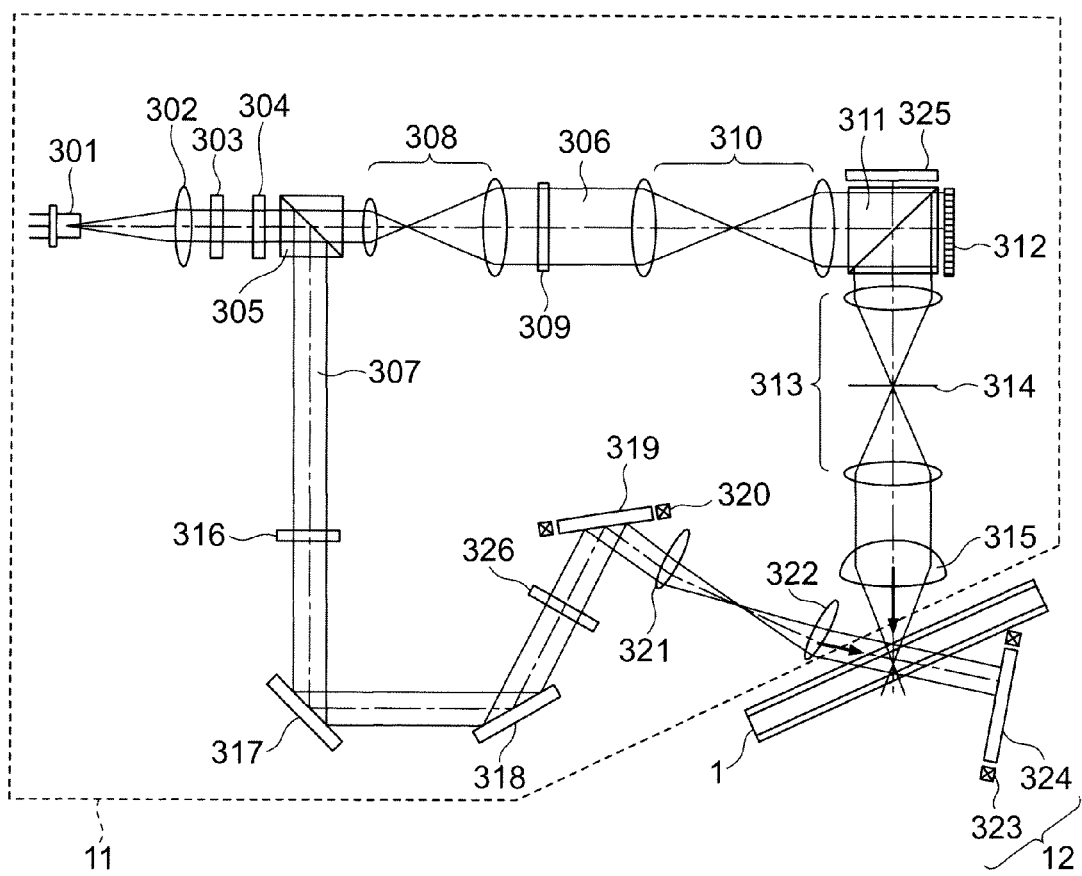
FIG. 3 is a schematic diagram for illustrating an embodiment of the pickup inside the optical-information recording/reproducing apparatus.

FIG. 3 illustrates the recording principle in an example of the basic optical-system configuration of the pickup 11 in the optical-information recording/reproducing apparatus 10. An optical beam, which is emitted from a light-source 301, passes through a collimator lens 302, then entering a shutter 303. When the shutter 303 is opened, the optical beam passes through the shutter 303. After that, the polarization direction of the optical beam is controlled by an optical element 304 so that the light-amount ratio between the p polarization and the s polarization becomes equal to a desired ratio. Here, the optical element 304 is constituted by, e.g., a half-wavelength plate. Still after that, the optical beam enters a PBS (: Polarization Beam Splitter) prism 305.

The optical beam, which has passed through the PBS prism 305, operates as a signal beam 306. Moreover, the optical-beam diameter of the signal beam 306 is expanded by a beam expander 308. After that, the signal beam 306 passes through a phase mask 309, relay lenses 310, and a PBS prism 311, then entering a spatial light modulator 312.

The signal beam, to which information is added by the spatial light modulator 312, is reflected by the PBS prism 311, then propagating through relay lenses 313 and a spatial filter 314. After that, the signal beam is converged into the optical-information storage medium 1 by an objective lens 315.

Meanwhile, the optical beam, which is reflected by the PBS prism 305, operates as a reference beam 307. Moreover, the polarization direction of the reference beam 307 is set into a predetermined polarization direction by a polarization-direction conversion element 316, depending on whether the case is the recording time or the reproducing time. After that, the reference beam passes through an angle-controlling element 326 by way of a mirror 317 and a mirror 318, then entering a galvanometer mirror 319. The angle of the galvanometer mirror 319 is made adjustable by an actuator 320. Consequently, the incident angle of the reference beam, which is to enter the optical-information storage medium 1 after passing through a lens 321 and a lens 322, can be set at a desired angle. Incidentally, in order to set the incident angle of the reference beam, an element for converting the wavefront of the reference beam is also usable, instead of using the galvanometer mirror.

Figure 15:
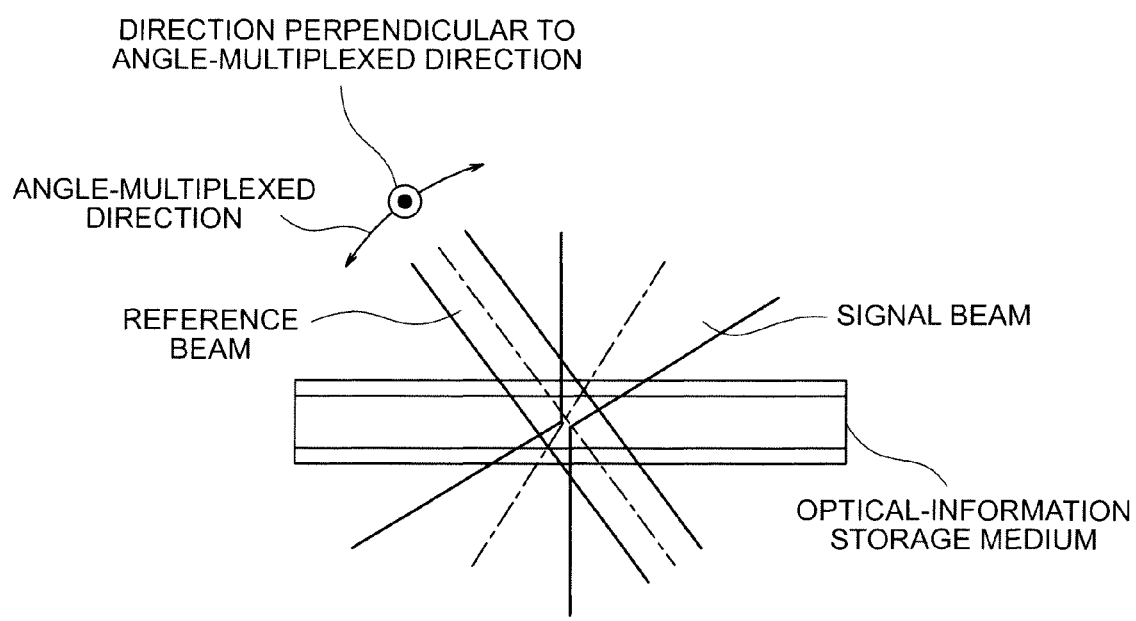
FIG. 15 is a diagram for illustrating the angle-multiplexed direction and a direction perpendicular to the angle-multiplexed direction.

The angle-controlling element 326 is an element which is capable of controlling the angle of the reference beam in a direction that is perpendicular to the angle-multiplexed direction controlled by the galvanometer mirror 319. The angle-controlling element 326 can be constituted by, e.g., a liquid-crystal element. However, the angle of the reference beam may also be controlled using a mirror such as the galvanometer mirror or a deformable mirror. Also, a mechanism similar to these mirrors may also be provided inside the reproduction-use-reference-beam optical system 12. FIG. 15 illustrates the angle that is to be controlled. FIG. 15 illustrates a manner in which the signal beam and the reference beam are superimposed on each other inside the optical-information storage medium. The angle multiplexing is performed in such a manner that the angle of the reference beam is controlled by the galvanometer mirror 319 within a surface which is constituted by the reference beam and the signal beam. The angle of the reference beam in the direction that is perpendicular to this angle-multiplexed direction is controlled by the angle-controlling element 326.

In this way, the signal beam and the reference beam are caused to enter the optical-information storage medium 1 in such a manner as to be superimposed on each other. As a result, an interference-fringe pattern is formed inside the storage medium. Writing this pattern into the storage medium allows the recording of the information therein. Also, the galvanometer mirror 319 makes it possible to change the incident angle of the reference beam which is to enter the optical-information storage medium 1. This feature allows implementation of the recording based on the angle multiplexing.

Hereinafter, a hologram is assumed in which information is recorded into one and the same area thereof in such a manner that the reference-beam angle is changed. Then, a partial hologram corresponding to any one of the reference-beam angles changed will be referred to as "a page". Also, the set of the pages which are angle-multiplexed into the one and the same area will be referred to as "a book".

Figure 4:
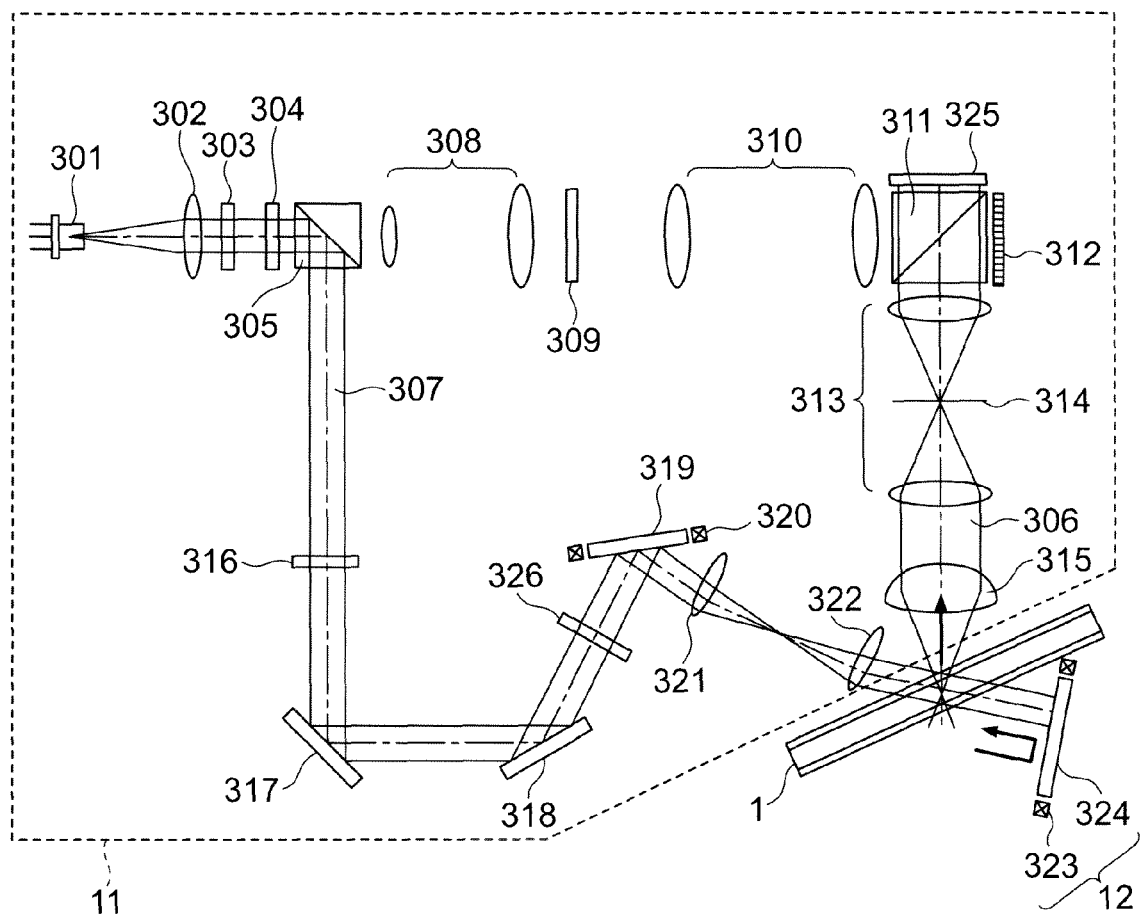
FIG. 4 is a schematic diagram for illustrating an embodiment of the pickup inside the optical-information recording/reproducing apparatus.

FIG. 4 illustrates the reproducing principle in the example of the basic optical-system configuration of the pickup 11 in the optical-information recording/reproducing apparatus 10. When reproducing the information recorded into the optical-information storage medium 1, as was described earlier, the reference beam is guided to enter the optical-information storage medium 1. Moreover, the reference beam, which has passed through the optical-information storage medium 1, is reflected by a galvanometer mirror 324 whose angle is made adjustable by an actuator 323. In this way, a reproduction-use reference beam is generated.

Furthermore, a reproduced beam, which is reproduced by this reproduction-use reference beam, propagates through the objective lens 315, the relay lenses 313, and the spatial filter 314. After that, the reproduced beam passes through the PBS prism 311, then entering an optical detector 325. In this way, the recorded signal can be reproduced. The units mentionable as the optical detector 325 are photographing elements such as, e.g., CMOS image sensor and CCD image sensor. Whatever element, however, is allowable as long as it is capable of reproducing the page data.

Figure 9A:
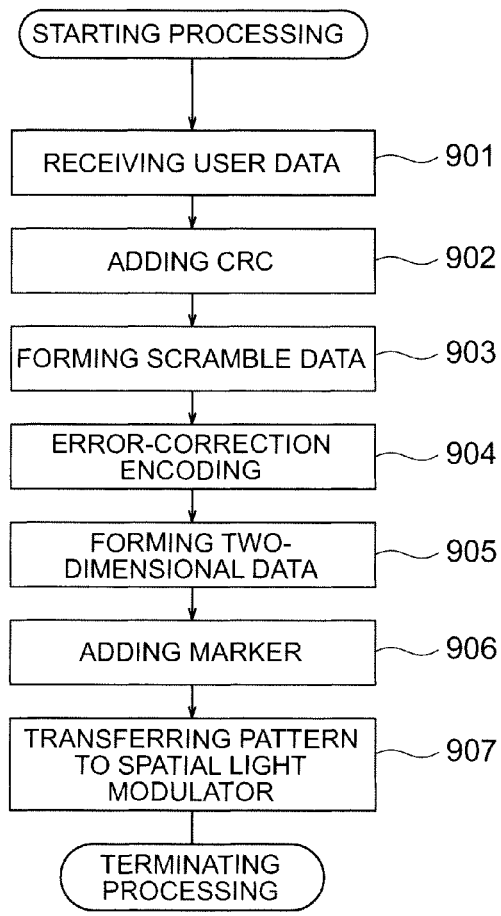
FIGS. 9A and 9B are schematic diagrams for illustrating an embodiment of the operation flows of the signal generation circuit and the signal processing circuit.
Figure 9B:
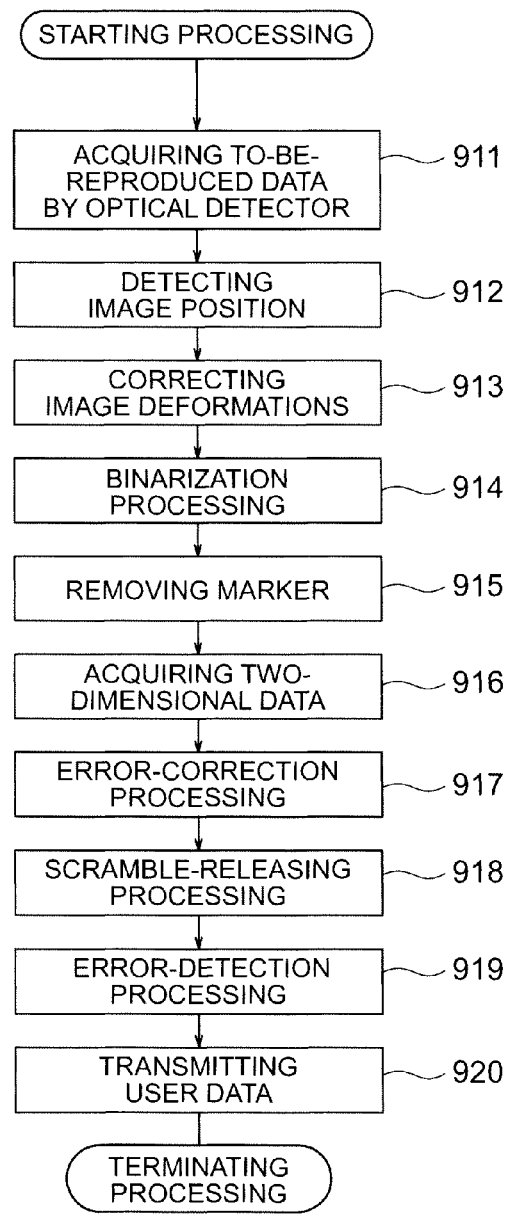

FIGS. 9A and 9B illustrate the data processing flows at the recording and reproducing times. FIG. 9A illustrates the data processing flow at the recording time in the signal generation circuit 86. This flow continues until a state where, after the data to be recorded is received in the input/output control circuit 90 (: 611), the data to be recorded is converted into two-dimensional data on the spatial light modulator 312. Meanwhile, FIG. 9B illustrates the data processing flow at the reproducing time in the signal processing circuit 85. This flow continues until a state where, after the two-dimensional data is detected by the optical detector 325, the reproduced data is transmitted in the input/output control circuit 90 (: 623).

Referring to FIG. 9A, the explanation will be given below regarding the data processing flow at the recording time. The user data is received (: 901). Then, the user data is divided into a plurality of data strings, and the CRC implementation of each data string is executed so that a reproducing-time error detection is executable (: 902). Next, the on-pixel number and the off-pixel number are made equal to each other. Moreover, a scramble processing, which adds a pseudo-random-number data string to each data string, is applied thereto in order to prevent the repetition of a same pattern (: 903). After that, an error-correction encoding such as Reed-Solomon Coding is executed so that a reproducing-time error correction is executable (: 904). Next, this data string is converted into M×N two-dimensional data. Then, this conversion is repeated by the amount of 1-page data, thereby constituting the two-dimensional data by the amount of 1 page (: 905). Furthermore, a marker, which becomes the criterion in the reproducing-time image-position detection and image-deformation correction, is added to the two-dimensional data constituted in this way (: 906). Then, the two-dimensional data is transferred to the spatial light modulator 312 (: 907).

Next, referring to FIG. 9B, the explanation will be given below regarding the data processing flow at the reproducing time. The two-dimensional image data detected by the optical detector 325 is transferred to the signal processing circuit 85 (: 911). Then, the image position is detected in such a manner that the marker involved in this image data is used as the criterion (: 912). Next, the image deformations, such as the image's inclination, magnification, and distortion, are corrected (: 913). After that, a binarization processing is executed to the image data (: 914), and the marker is removed therefrom (: 915), thereby acquiring the two-dimensional data by the amount of 1 page (: 916). Moreover, after the two-dimensional data acquired in this way has been converted into a plurality of data strings, an error-correction processing is executed thereto (: 917), thereby removing a parity data string therefrom. Next, a scramble-releasing processing is applied thereto (: 918). Furthermore, CRC parity is deleted by executing the CRC-based error-detection processing (: 919). After that, the user data is transmitted via the input/output control circuit 90 (: 920).

Figure 7:
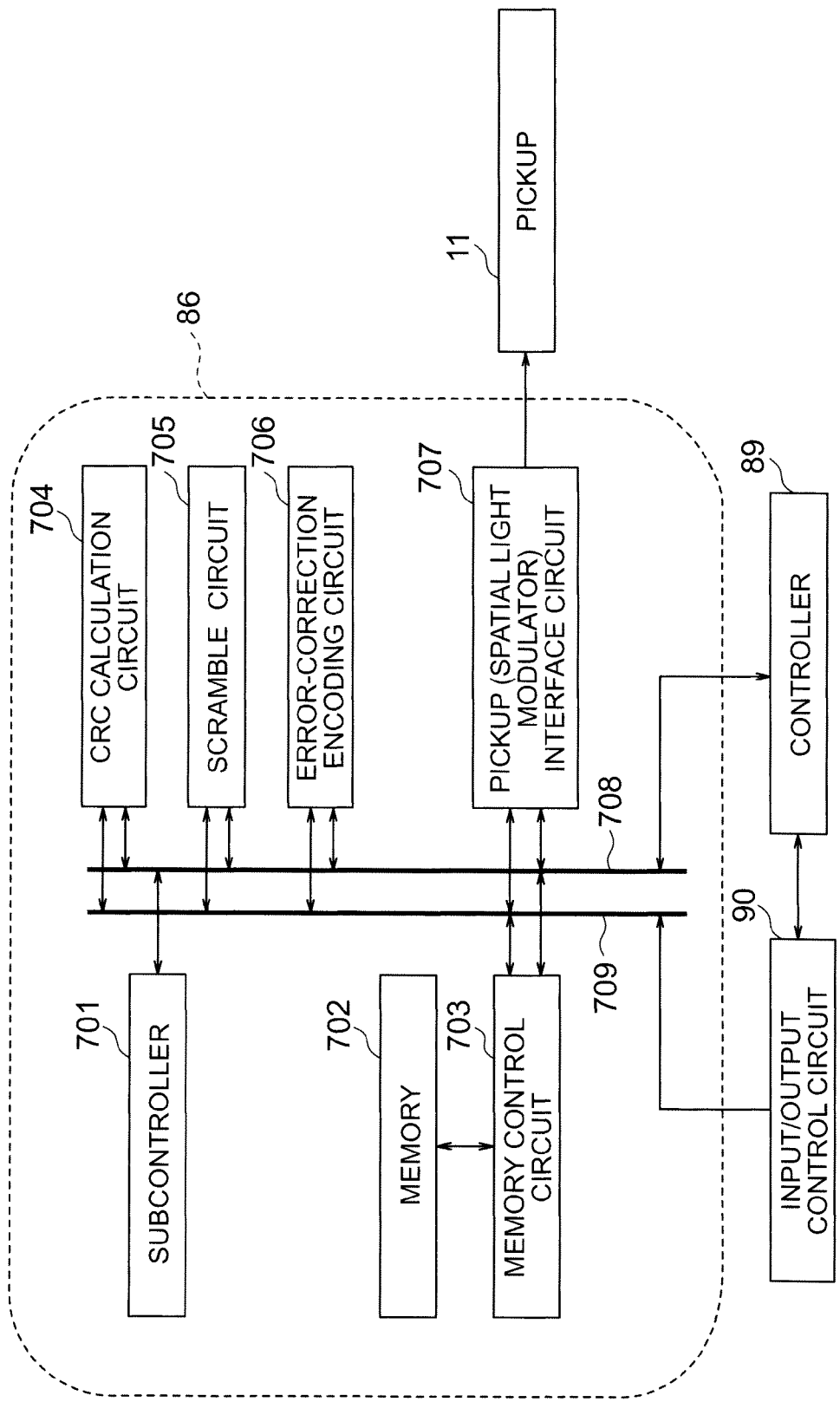
FIG. 7 is a schematic diagram for illustrating an embodiment of a signal generation circuit inside the optical-information recording/reproducing apparatus.

FIG. 7 is a block diagram of the signal generation circuit 86 of the optical-information recording/reproducing apparatus 10.

When the input of the user data is started into the input/output control circuit 90, the input/output control circuit 90 issues, to the controller 89, a notice to the effect that the input of the user data is started. Having received this notice, the controller 89 issues, to the signal generation circuit 86, an instruction of performing the recording processing of the 1-page-amount data inputted from the input/output control circuit 90. This recording-processing instruction from the controller 89 is transmitted to a subcontroller 701 inside the signal generation circuit 86 via a control-use line 708. Having received this instruction, the subcontroller 701 performs controls over respective signal processing circuits via the control-use line 708 in such a manner as to cause the respective signal processing circuits to be operated in parallel to each other. First, the subcontroller 701 controls a memory control circuit 703 to store, into a memory 702, the user data inputted from the input/output control circuit 90 via a data line 709. If the user data stored into the memory 702 has attained to a certain constant amount, a CRC calculation circuit 704 performs a control of executing the CRC implementation of the user data. Next, a scramble circuit 705 applies the scramble processing to the CRC-implemented data, which adds a pseudo-random-number data string to this data. Moreover, an error-correction encoding circuit 706 performs a control of executing the error-correction encoding processing to the scrambled data, which adds a parity data string to this data. Finally, the subcontroller 701 causes a pickup interface circuit 707 to read the error-correction-encoded data from the memory 702 in accordance with an arrangement sequence of the two-dimensional data on the spatial light modulator 312. The subcontroller 701, after adding the marker which becomes the criterion at the reproducing time, transfers the marker-added two-dimensional data to the spatial light modulator 312 inside the pickup 11.

Figure 8:
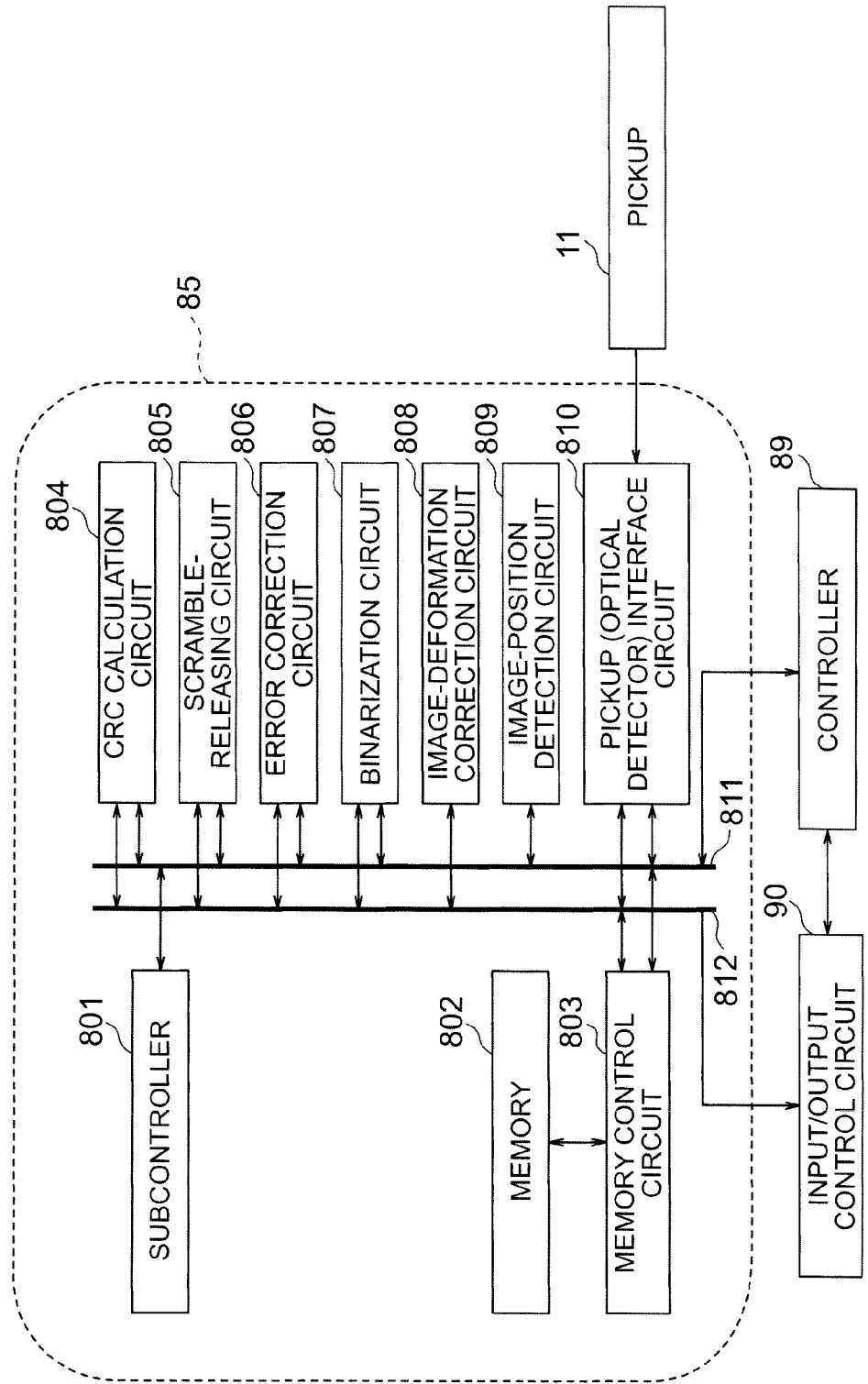
FIG. 8 is a schematic diagram for illustrating an embodiment of a signal processing circuit inside the optical-information recording/reproducing apparatus.

FIG. 8 is a block diagram of the signal processing circuit 85 of the optical-information recording/reproducing apparatus 10.

When the image data is detected by the optical detector 325 inside the pickup 11 the controller 89 issues, to the signal processing circuit 85, an instruction of performing the reproducing processing of the 1-page-amount data inputted from the pickup 11. This reproducing-processing instruction from the controller 89 is transmitted to a subcontroller 801 inside the signal processing circuit 85 via a control-use line 811. Having received this instruction, the subcontroller 801 performs controls over respective signal processing circuits via the control-use line 811 in such a manner as to cause the respective signal processing circuits to be operated in parallel to each other. First, via a data line 812, the subcontroller 801 controls a memory control circuit 803 to store, into a memory 802, the image data inputted from the pickup 11 via a pickup interface circuit 810. If the image data stored into the memory 802 has attained to a certain constant amount, an image-position detection circuit 809 performs a control of detecting the marker out of the image data stored into the memory 802, and extracting the effective-data range. Next, using the marker detected, an image-deformation correction circuit 808 performs the correction of the image deformations, such as the image's inclination, magnification, and distortion. The correction circuit 808, then, performs a control of converting the image data into a two-dimensional data size which is expected. After that, a binarization circuit 807 performs the binarization processing of making the "0"-or-"1" judgment on each bit data of a plurality of bits which constitute the size-converted two-dimensional data. The binarization circuit 807, then, performs a control of storing the data onto the memory 802 in accordance with an arrangement sequence of the outputs of the reproduced data. Next, an error correction circuit 806 corrects an error involved in each data string, and a scramble-releasing circuit 805 releases the scramble processing which adds a pseudo-random-number data string to the data. After that, a CRC calculation circuit 804 confirms that no error is involved within the user data on the memory 802. After that, the user data is transferred to the input/output control circuit 90 from the memory 802.

FIGS. 11A and 11B are diagrams for illustrating the relationship between the presence or absence of an angle shift of the reference beam at a location at which the angle-multiplexed recording is performed, and the reproduced image resulting therefrom.

FIG. 11A illustrates an example of the reproduced image in the following case: The angle shift of the reference beam perpendicular to the angle-multiplexed direction is absent, and the angle shift of the reference beam in the angle-multiplexed direction is absent. FIG. 11A shows that the reproduced image becomes brighter as a whole. FIG. 11B illustrates an example of the reproduced image in the following case: The angle shift perpendicular to the angle-multiplexed direction is absent, but the angle shift in the angle-multiplexed direction is present by the amount of 0.1 degree. FIG. 11B shows that the reproduced image becomes darker as a whole. Namely, when the angle shift perpendicular to the angle-multiplexed direction is absent, the light amount of the entire reproduced image changes significantly, if the angle shift is present in the angle-multiplexed direction.

FIG. 11C illustrates an example of the reproduced image in the following case: The angle shift perpendicular to the angle-multiplexed direction is present, but the angle shift in the angle-multiplexed direction is absent. FIG. 11C shows that the reproduced image becomes bright and dark patterns. FIG. 11D illustrates an example of the reproduced image in the following case: The angle shift perpendicular to the angle-multiplexed direction is present, and the angle shift in the angle-multiplexed direction is present by the amount of 0.1 degree. FIG. 11D shows that the reproduced image becomes bright and dark patterns as is the case with FIG. 11C. Namely, when the angle shift perpendicular to the angle-multiplexed direction is present, the light amount of the entire reproduced image does not change substantially, even if the angle is shifted in the angle-multiplexed direction.

Figure 12A:
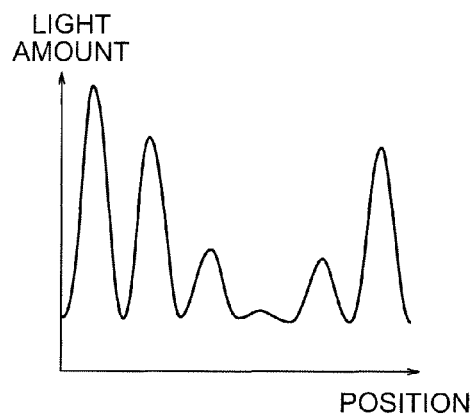
FIGS. 12A and 12B are diagrams for illustrating the relationship between the presence or absence of the angle shift of the reference beam in the direction perpendicular to the angle-multiplexed direction, and the light amount at the time of the reproduced-light-amount scanning.
Figure 12B:
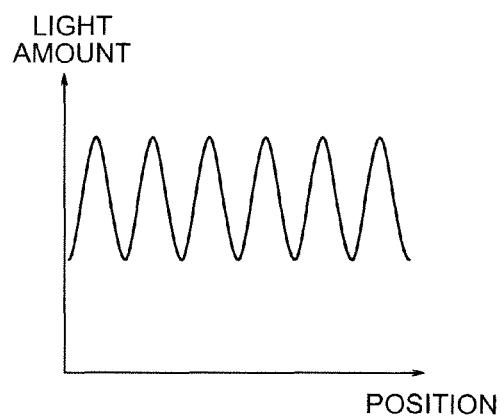

FIGS. 12A and 12B are diagrams for illustrating the relationship between the presence or absence of the angle shift of the reference beam in the direction perpendicular to the angle-multiplexed direction, and the light amount at the time of the reproduced-light-amount scanning. In FIGS. 12A and 12B, the following situation is assumed: Namely, the total light amount of the reproduced beam is detected by scanning a location in which the books are continuously recorded in a manner of being adjacent to each other. Here, this scanning is performed in the radial direction or rotational direction of the optical-information storage medium while illuminating the location with the reference beam.

FIG. 12A illustrates the case where the angle shift perpendicular to the angle-multiplexed direction is absent. As illustrated in FIG. 11A and FIG. 11B, the light amount of the reproduced beam changes significantly, if the angle shift occurs even in a slightest amount in the angle-multiplexed direction. As a result, the maximum value of the reproduced light amount at each book position is not stabilized by a variation in the multiplexed angles at the recording time, or by an angle control variation in the multiplexed directions at the reproducing time.

FIG. 12B illustrates the case where the angle shift perpendicular to the angle-multiplexed direction is present. As illustrated in FIG. 11C and FIG. 11D, the light amount of the reproduced beam is stabilized, even if the angle shift has occurred in the angle-multiplexed direction. As a result, the maximum value of the reproduced light amount at each book position can be detected in a stable manner, even if there exists the variation in the multiplexed angles at the recording time, or the angle control variation in the multiplexed directions at the reproducing time.

Figure 13B:
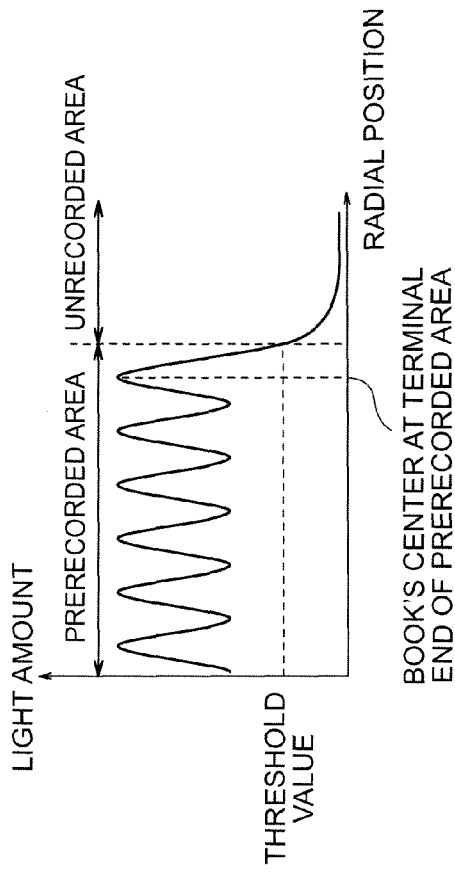
FIGS. 13A-13C are diagrams for illustrating the relationship between the location of a prerecorded area and an unrecorded area, and the light amount which is detected at the scanning time.
Figure 13C:
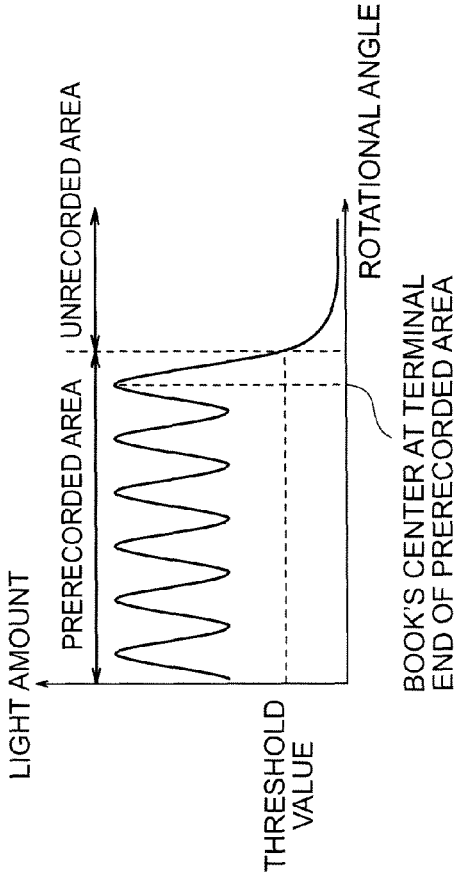
Figure 13A:
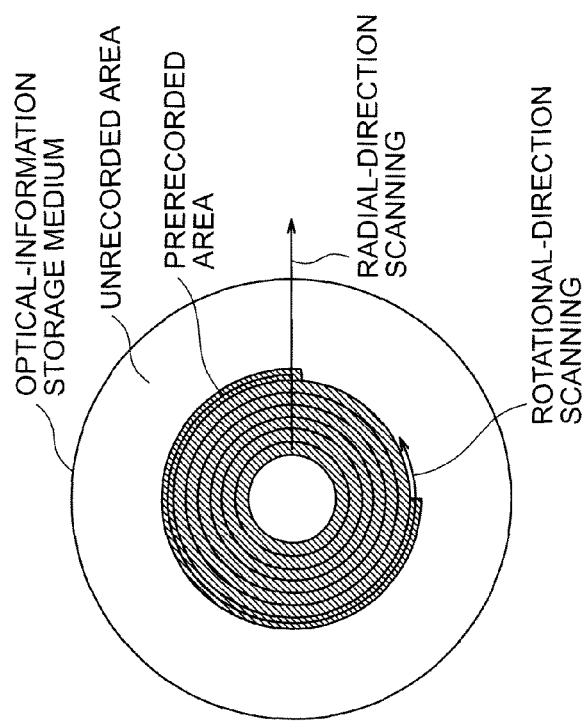

FIGS. 13A-13C are diagrams for illustrating the relationship between the location of a prerecorded area and an unrecorded area, and the light amount which is detected at the scanning time.

FIG. 13A illustrates a prerecorded area and an unrecorded area on the optical-information storage medium. The following situation is assumed: Namely, the prerecorded area exists concentrically from the inner circumference to the outer circumference of the optical-information storage medium. Moreover, the recording is terminated halfway in the course of the rotational angle of the outermost circumference of the prerecorded area.

FIG. 13B illustrates the light amount which is obtained when the outermost circumference of the prerecorded area is determined by scanning the prerecorded area in the radial direction. Here, this scanning is performed after the reference-beam angle is shifted in the direction perpendicular to the angle-multiplexed direction. When the prerecorded area is scanned, a light amount which is larger than a threshold value is always detected. Moreover, a peak of the light amount is obtained every time the scanning passes through a book. Furthermore, if the scanning exceeds the outermost circumference of the prerecorded area, the light amount becomes a one which is smaller than the threshold value. Accordingly, this light amount smaller than the threshold value is detected, then judging the last peak position of the light amount as the outermost circumference of the prerecorded area.

FIG. 13C illustrates the light amount which is obtained when the terminal end of the prerecorded area is determined by scanning the prerecorded area in the rotational direction. When the prerecorded area is scanned, a light amount which is larger than a threshold value is always detected. Moreover, a peak of the light amount is obtained every time the scanning passes through a book. Furthermore, if the scanning exceeds the outermost circumference of the prerecorded area, the light amount becomes a one which is smaller than the threshold value. Accordingly, this light amount smaller than the threshold value is detected, then judging the last peak position of the light amount as the terminal end of the prerecorded area.

According to the above-described explanation, the prerecorded area is scanned in such a manner that the reference-beam angle is shifted into a direction which is perpendicular to the angle-multiplexed direction. This feature makes it possible to detect the boundary between the prerecorded area and the unrecorded area in a stable manner.

FIG. 1 is a diagram for indicating a flowchart for judging the boundary between a prerecorded area and an unrecorded area. Here, the explanation will be given below assuming that the optical-information storage medium 1 is circular, and that the recording is performed concentrically from the inner circumference to the outer circumference.

First, the angle-controlling element 326 is driven, so that the angle of the reference beam is shifted into a direction which is perpendicular to the angle-multiplexed direction (: 101).

Next, the access control circuit 81 is controlled, thereby driving the pickup 11 in the radial direction of the optical-information storage medium 1 from the inner circumference to the outer circumference. Simultaneously, the scanning is performed by continuously detecting the reproduced beam using the optical detector 325. Here, this continuous detection is performed while illuminating the optical-information storage medium 1 with the reference beam (: 102). As described earlier, the reproduced beam can be obtained in the prerecorded area of the optical-information storage medium 1; whereas the reproduced beam cannot be obtained in the unrecorded area thereof. Accordingly, if the light amount obtained by the optical detector 325 is not found to be lower than a predetermined threshold value, the scanning is continued. If, meanwhile, the light amount is found to be lower than the predetermined threshold value, the scanning is terminated (: 103). Moreover, the position of the outermost circumference of the prerecorded area in the radial direction is calculated from the relationship between the radial position and the light amount at the time of the scanning. Then, the access control circuit 81 is controlled, thereby positioning the pickup 11 (: 104).

Next, the disc-rotation-motor control circuit 88 is controlled, thereby driving the rotation motor 50. Simultaneously, the scanning is performed by continuously detecting the reproduced beam using the optical detector 325. Here, this continuous detection is performed while illuminating the optical-information storage medium 1 with the reference beam in the rotational direction of the optical-information storage medium 1 (: 105). Furthermore, if the light amount obtained by the optical detector 325 is not found to be lower than a predetermined threshold value, the scanning is continued. If, meanwhile, the light amount is found to be lower than the predetermined threshold value, the scanning is terminated (: 106). Namely, at the step 106, the scanning is continued if the light amount is not found to be lower than the predetermined threshold value. Here, however, if the light amount is not found to be lower than the predetermined threshold value even if a one-circulation scanning has been performed around the optical-information storage medium 1, it can be judged that all of the one circulation of the optical-information storage medium has been prerecorded. Consequently, the scanning is terminated in this case (: 107). In addition, the terminal-end position of the prerecorded area in the rotational direction is calculated from the relationship between the rotational angle and the light amount at the time of the scanning (: 108).

Finally, the angle-controlling element 326 is driven, so that the angle of the reference beam in the direction perpendicular to the angle-multiplexed direction is set at the angle that is suitable for the recording/reproducing operation (: 109).

Incidentally, the explanation has been given assuming that the optical-information storage medium 1 is circular, and that the recording is performed concentrically from the inner circumference to the outer circumference. The present invention, however, is not limited thereto. Namely, the recording may also be performed from the outer circumference to the inner circumference, or may also be performed in a spiral manner. Also, the optical-information storage medium 1 may also be rectangular, for example. In whatever case, it becomes possible to judge the boundary between the prerecorded area and the unrecorded area by performing the scanning that is suitable for the profile of the optical-information storage medium and the recording sequence.

Also, the prerecorded area is not necessarily required to be continuous. For example, even if the prerecorded area is separated by the optical-information storage medium 1, it is possible to judge the boundary between the prerecorded area and the unrecorded area by performing the scanning of the optical-information storage medium.

Incidentally, in order to prevent the photosensitizing of the unrecorded area, the light-source 301 may also be controlled so that its energy becomes lower than the energy needed for the pre-cure. Otherwise, a separately-set-up light-source is also usable whose wavelength does not give rise to the photosensitizing of the optical-information storage medium 1.

Additionally, in order to allow high-speed implementation of the processings, the detection area of the optical detector 325 is also usable for the light-amount detection in a manner of being limited. Otherwise, a high-speed optical detector is also usable for the light-amount detection in a manner of being separately set up from the optical detector 325.

FIGS. 6A-6C illustrate the operation flows for the recording/reproducing operations in the optical-information recording/reproducing apparatus 10. Here, in particular, the explanation will be given regarding the recording/reproducing flows which take advantage of the holography.

FIG. 6A illustrates the operation flow until a state where, after the optical-information storage medium 1 is inserted into the optical-information recording/reproducing apparatus 10, the preparation for the recording or the reproduction is completed. FIG. 6B illustrates the operation flow ranging from the preparation-completed state until a state where information is recorded into the optical-information storage medium 1. FIG. 6C illustrates the operation flow ranging from the preparation-completed state until a state where the information recorded into the optical-information storage medium 1 is reproduced.

As illustrated in FIG. 6A, when the optical-information storage medium 1 is inserted into the optical-information recording/reproducing apparatus 10 (: 601), the apparatus 10 makes a disc judgment as to whether or not the optical-information storage medium 1 inserted therein is an optical-information storage medium for recording/reproducing digital information by taking advantage of the holography (: 602).

If, as a result of the disc judgment, it is judged that the medium 1 is the optical-information storage medium for recording/reproducing the digital information by taking advantage of the holography, the optical-information recording/reproducing apparatus 10 reads control data provided in the optical-information storage medium (: 603). This means that the apparatus 10 acquires, e.g., information about the optical-information storage medium and information about respective types of setting conditions at the recording or reproducing time.

After reading the control data, the optical-information recording/reproducing apparatus 10 performs learning processings associated with respective types of adjustments based on the control data, and associated with the pickup 11 (: 604). In this way, the optical-information recording/reproducing apparatus 10 completes the preparation for the recording or the reproduction (: 605).

In the present invention, even if the information about the prerecorded location does not exist in the control data, or even if the control data is not read out, it is possible to judge the boundary between the prerecorded area and the unrecorded area by performing the scanning of the optical-information storage medium. Also, even if the control data exists at the terminal end of the prerecorded area, or even if the control data exists on the final page of the last book of the prerecorded area, it is also possible to judge the boundary between the prerecorded area and the unrecorded area. At this time, this judgment is made possible by scanning the light amount in such a manner that the reference-beam angle is shifted into the direction perpendicular to the angle-multiplexed direction. This feature allows implementation of the high-speed access to the control data. Here, the information to be judged may be user data, or the control data.

The operation flow ranging from the preparation-completed state until the state where information is recorded into the optical-information storage medium is as follows, as is illustrated in FIG. 6B: Namely, first, the apparatus 10 receives data to be recorded (: 611), then transmitting information corresponding to the data into the spatial light modulator inside the pickup 11.

After that, in order to be able to record high-quality information into the optical-information storage medium, the apparatus 10 performs respective types of recording-use learning processings in advance (: 612). Here, these learning processings are, e.g., power optimization of the light-source 301 and optimization of the exposure time by the shutter 303, depending on the requirements concerned. In the recording-use learning processings, it is also possible to judge the boundary between the prerecorded area and the unrecorded area in the recording-use learning area on the optical-information storage medium. At this time, this judgment is made possible by scanning the light amount in such a manner that the reference-beam angle is shifted into the direction perpendicular to the angle-multiplexed direction.

After that, in a seek operation (: 613), the apparatus 10 controls the access control circuit 81, thereby positioning the positions of the pickup 11 and the cure optical system 13 at a predetermined position of the optical-information storage medium 1. If the optical-information storage medium 1 is equipped with address information, the apparatus 10 reproduces the address information, then confirming whether or not they are positioned at the objective position. Moreover, if they are not deployed at the objective position, the apparatus 10 calculates a shift amount relative to the predetermined position, then repeating the positioning operation again. Here, if the optical-information storage medium 1 is not equipped with the address information, it is also possible to judge the boundary between the prerecorded area and the unrecorded area in the user-data area on the optical-information storage medium, to search for the terminal end of the prerecorded area, and to perform an additional writing from an area adjacent thereto. At this time, this judgment is made possible by scanning the light amount in such a manner that the reference-beam angle is shifted into the direction perpendicular to the angle-multiplexed direction.

After that, the apparatus 10 pre-cures the predetermined area by using an optical beam emitted from the cure optical system 13 (: 614). Furthermore, the apparatus 10 records the data by using the reference beam and the signal beam which are emitted from the pickup 11 (: 615).

After recording the data, the apparatus 10 post-cures the predetermined area by using an optical beam emitted from the cure optical system 13 (: 616). It is also allowable to verify the data depending on the requirements.

Additionally, the information about the prerecorded area and the unrecorded area is judged by scanning the light amount in such a manner that the reference-beam angle is shifted into the direction perpendicular to the angle-multiplexed direction. This information is recorded into the optical-information storage medium as control data. This control data makes it possible to perform the additional-writing operation at the next recording time by accessing the boundary between the prerecorded area and the unrecorded area at a high speed.

The operation flow ranging from the preparation-completed state until the state where the information recorded into the optical-information storage medium 1 is reproduced is as follows, as is illustrated in FIG. 6C: Namely, first, in a seek operation (: 621), the apparatus 10 controls the access control circuit 81, thereby positioning the positions of the pickup 11 and the reproduction-use-reference-beam optical system 12 at the predetermined position of the optical-information storage medium 1. If the optical-information storage medium 1 is equipped with the address information, the apparatus 10 reproduces the address information, then confirming whether or not they are positioned at the objective position. Moreover, if they are not deployed at the objective position, the apparatus 10 calculates a shift amount relative to the predetermined position, then repeating the positioning operation again.

After that, the apparatus 10 reproduces and reads the information, which is recorded into the optical-information storage medium 1, by emitting the reference beam to the storage medium 1 from the pickup 11 (: 622). The apparatus 10, then, transmits the reproduced data (: 623).

From conventionally, in the optical-information reproducing apparatus which takes advantage of the angle-multiplexing-scheme-based holography, when reproducing the optical-information storage medium at least a partial storage area of which is recorded, there has existed the following requirement in order to judge whether or not the hologram is recorded at a predetermined location of the optical-information storage medium: Namely, the control data for indicating at which location the recording had been performed at the recording time is required to be recorded into a predetermined location of the optical-information storage medium, or is required to be recorded into a separately-set-up external storage medium. If there exists none of the control data like this, it has been found impossible to judge whether or not the hologram is recorded, unless the reference-beam angle is scanned in the angle-multiplexed direction. Consequently, there has existed the following problem: Namely, there exists none of an effective method for judging at a high speed whether or not the hologram is recorded at a predetermined location of the optical-information storage medium. According to the first embodiment explained so far, however, it is possible to judge at a high speed the boundary between the prerecorded area and the unrecorded area of the optical-information storage medium, even if there exists none of the above-described control data. This feature makes it possible to provide the optical-information reproducing apparatus that is easy to use.

Embodiment 2

Next, referring to the accompanying drawings, the explanation will be given below concerning a second embodiment of the present invention. The configuration of the optical-information reproducing apparatus in the second embodiment is basically the same as the one in the first embodiment. Accordingly, the explanation thereof will be omitted here.

Figure 14:
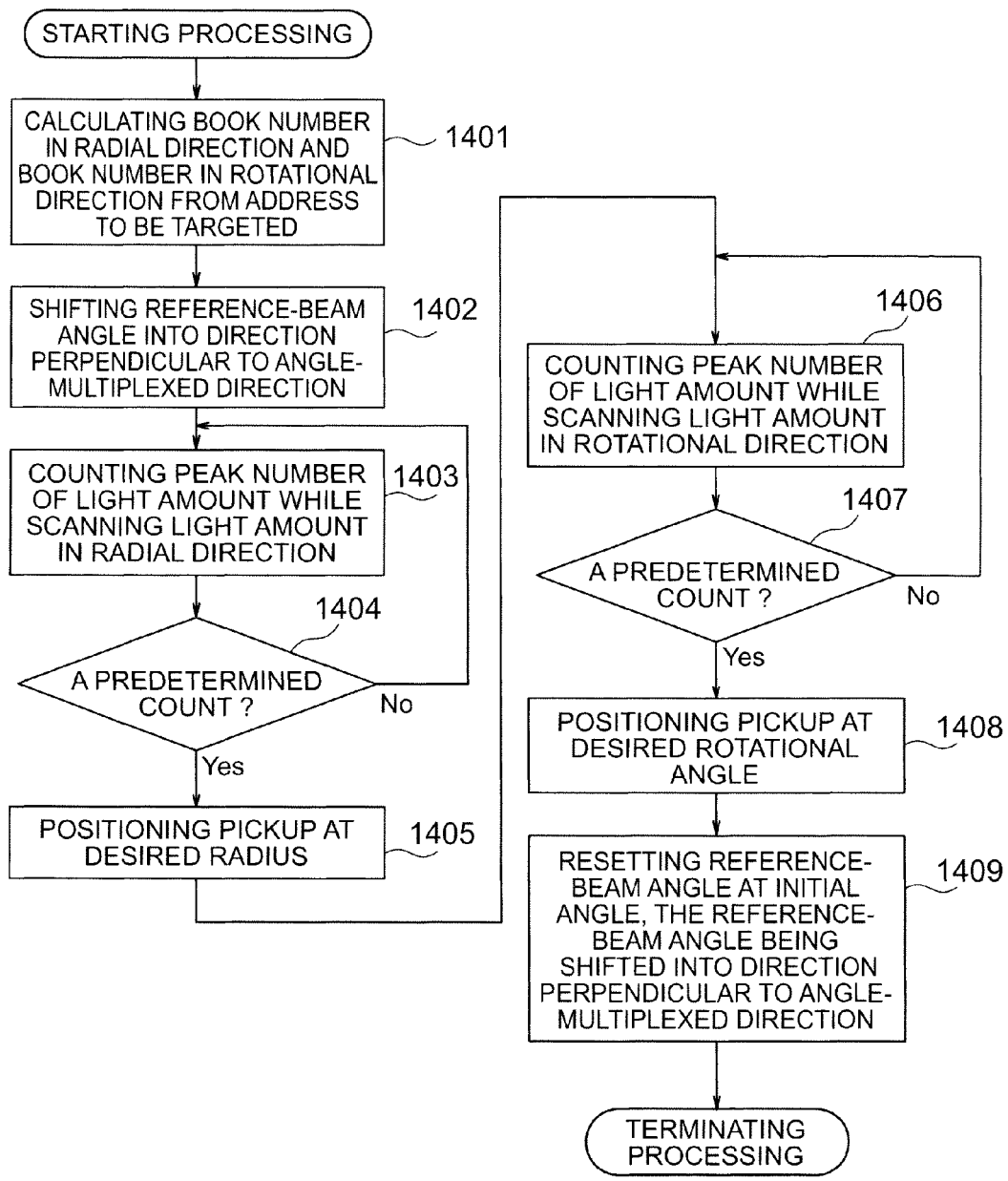
FIG. 14 is a diagram for indicating a flowchart for performing the positioning of the pickup at an address position, which is to be targeted, on the basis of information about the reproduced light amount.

FIG. 14 illustrates a flowchart for performing the positioning of the pickup at an address position, which is to be targeted, on the basis of information about the reproduced light amount. Here, the explanation will be given below assuming that the optical-information storage medium 1 is circular, and that the recording is performed concentrically from the inner circumference to the outer circumference.

First, the radial position and the rotational angle at an address to be targeted of the optical-information storage medium 1 are calculated. Moreover, the following two numbers are calculated: Namely, the number of the books which are recorded from the innermost circumference to the radial position at the to-be-targeted address, and the number of the books which are recorded from a rotational angle, which becomes the criterion at the to-be-targeted radial position, to the rotational angle at the to-be-targeted address (: 1401). Next, the angle-controlling element 326 is driven, so that the angle of the reference beam is shifted into a direction which is perpendicular to the angle-multiplexed direction (: 1402).

Next, the access control circuit 81 is controlled, thereby driving the pickup 11 in the radial direction of the optical-information storage medium 1 from the inner circumference to the outer circumference. Simultaneously, the scanning is performed by continuously detecting the reproduced beam using the optical detector 325. Here, this continuous detection is performed while illuminating the optical-information storage medium 1 with the reference beam (: 1403). As the scanning is continued, as was explained in FIG. 12B, a peak of the light amount is obtained at the central point of a book every time the book is scanned. Accordingly, the peak number of the light amount is counted. Then, if the counted number has attained to the book number calculated at the step 1401, the scanning in the radial direction is terminated. If, meanwhile, the counted number has not attained thereto, the scanning is continued (: 1404). Furthermore, when the scanning in the radial direction is terminated, the access control circuit 81 is controlled, thereby positioning the pickup 11 at the to-be-targeted radial position (: 1405). At this time, the to-be-targeted radial position may be calculated from the relationship between the radial position and the light amount at the time of the scanning. Otherwise, a feedback control may be performed so that the light amount becomes its maximum in proximity to the to-be-targeted radial position.

Next, the disc-rotation-motor control circuit 88 is controlled, thereby driving the rotation motor 50. Simultaneously, the scanning is performed by continuously detecting the reproduced beam using the optical detector 325. Here, this continuous detection is performed while illuminating the optical-information storage medium 1 with the reference beam in the rotational direction of the optical-information storage medium 1 (: 1406). As the scanning is continued, a peak of the light amount is obtained at a book position. Accordingly, the peak number of the light amount is counted. Then, if the counted number has attained to the book number calculated at the step 1401, the scanning in the rotational direction is terminated. If, meanwhile, the counted number has not attained thereto, the scanning is continued (: 1407). Furthermore, when the scanning in the rotational direction is terminated, the access control circuit 81 is controlled to drive the rotation motor 50, thereby positioning the pickup 11 at the to-be-targeted rotational angle (: 1408). At this time, the to-be-targeted rotational angle may be calculated from the relationship between the rotational angle and the light amount at the time of the scanning. Otherwise, a feedback control may be performed so that the light amount becomes its maximum in proximity to the to-be-targeted rotational angle.

Finally, the angle-controlling element 326 is driven, so that the angle of the reference beam in the direction perpendicular to the angle-multiplexed direction is reset at the angle that is suitable for the recording/reproducing operation (: 1409).

Incidentally, the explanation has been given assuming that the optical-information storage medium 1 is circular, and that the recording is performed concentrically from the inner circumference to the outer circumference. The present invention, however, is not limited thereto. Namely, the recording may also be performed from the outer circumference to the inner circumference, or may also be performed in a spiral manner. Also, the optical-information storage medium 1 may also be rectangular, for example. In whatever case, it becomes possible to position the pickup 11 at the to-be-targeted address by performing the scanning that is suitable for the profile of the optical-information storage medium and the recording sequence.

Incidentally, in order to prevent the photosensitizing of the unrecorded area, the light-source 301 may also be controlled so that its energy becomes lower than the energy needed for the pre-cure. Otherwise, a separately-set-up light-source is also usable whose wavelength does not give rise to the photosensitizing of the optical-information storage medium 1.

Additionally, in order to allow high-speed implementation of the processings, the detection area of the optical detector 325 is also usable for the light-amount detection in a manner of being limited. Otherwise, a high-speed optical detector is also usable for the light-amount detection in a manner of being separately set up from the optical detector 325.

According to the second embodiment explained so far, it is possible to position, at a high speed, the pickup at the position at which the hologram is recorded. This feature makes it possible to provide the optical-information reproducing apparatus that is easy to use.

Embodiment 3

Next, referring to the accompanying drawings, the explanation will be given below concerning a third embodiment of the present invention. The configuration of the optical-information reproducing apparatus in the third embodiment is basically the same as the one in the first embodiment. Accordingly, the explanation thereof will be omitted here.

Figure 5:
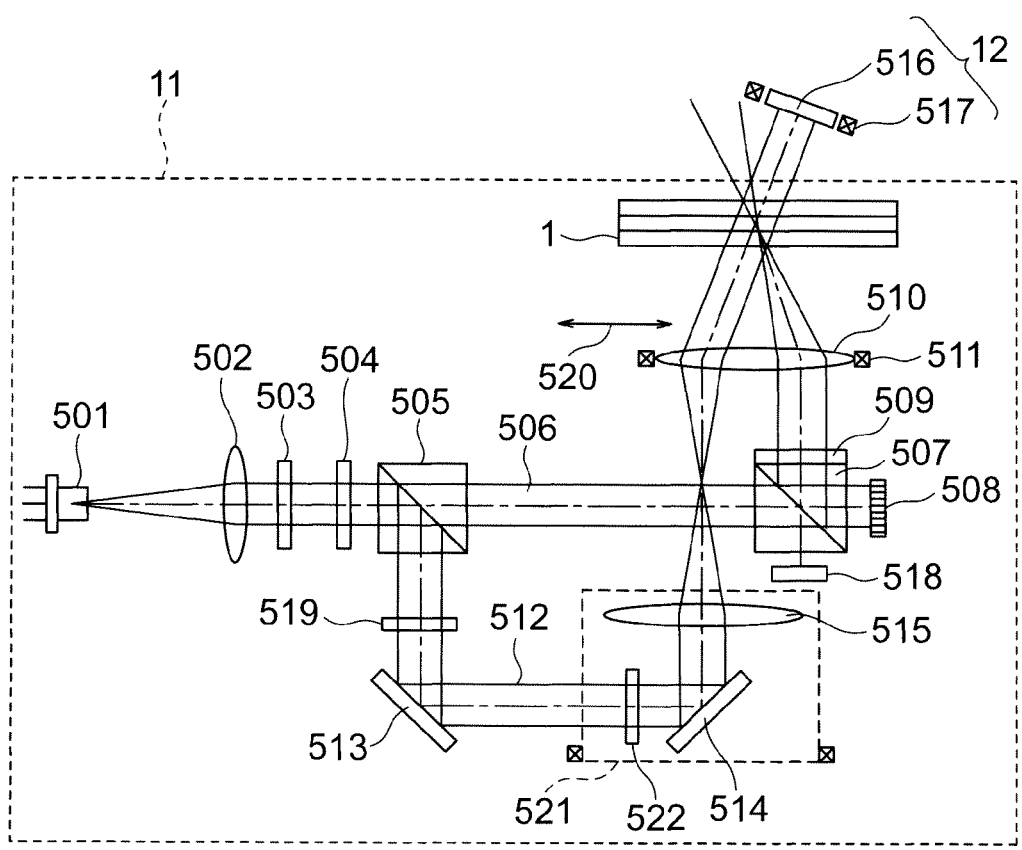
FIG. 5 is a schematic diagram for illustrating an embodiment of the pickup inside the optical-information recording/reproducing apparatus.

FIG. 5 is a diagram for illustrating another configuration of the pickup 11. In FIG. 5, an optical beam, which is emitted from a light-source 501, passes through a collimator lens 502, then entering a shutter 503. When the shutter 503 is opened, the optical beam passes through the shutter 503. After that, the polarization direction of the optical beam is controlled by an optical element 504 so that the light-amount ratio between the p polarization and the s polarization becomes equal to a desired ratio. Here, the optical element 504 is constituted by, e.g., a half-wavelength plate. Still after that, the optical beam enters a polarization beam splitter 505.

The optical beam, which has passed through the polarization beam splitter 505, enters a spatial light modulator 508 via a polarization beam splitter 507. The signal beam 506, to which information is added by the spatial light modulator 508, is reflected by the polarization beam splitter 507. Moreover, the signal beam propagates through an angle filter 509 for permitting only a predetermined incident angle of optical beam to pass therethrough. After that, the signal beam is converged into the optical-information storage medium 1 by an objective lens 510.

Meanwhile, the optical beam, which is reflected by the polarization beam splitter 505, operates as a reference beam 512. Furthermore, the polarization direction of the reference beam 512 is set into a predetermined polarization direction by a polarization-direction conversion element 519, depending on whether the case is the recording time or the reproducing time. After that, the reference beam enters a lens 515 by way of a mirror 513 and a mirror 514. The lens 515 plays a role of converging the reference beam 512 onto a back-focus plane of the objective lens 510. Subsequently, the reference beam, which is temporarily converged onto the back-focus plane of the objective lens 510, is caused to become a parallel beam again by the objective lens 510. The reference beam, then, enters the optical-information storage medium 1.

Here, the objective lens 510 or an optical block 521 is drivable in a direction which is denoted by, e.g., a reference numeral 520. Then, the position of the objective lens 510 or the optical block 521 is shifted along the driving direction 520. This shifting operation changes the relative position relationship between the objective lens 510 and the reference-beam-converged point on the back-focus plane of the objective lens 510. Consequently, the incident angle of the reference beam, which is to enter the optical-information storage medium 1, can be set at a desired angle. Incidentally, the incident angle of the reference beam may be set at a desired angle by driving the mirror 514 using an actuator, instead of driving the objective lens 510 or the optical block 521.

An angle-controlling element 522 is an element which is capable of controlling the angle of the reference beam in a direction that is perpendicular to the driving direction 520. The angle-controlling element 522 can be constituted by, e.g., a liquid-crystal element. However, the angle may also be controlled using a mirror such as the galvanometer mirror or a deformable mirror. Also, a mechanism similar to these mirrors may also be provided inside the reproduction-use-reference-beam optical system 12.

In this way, the signal beam and the reference beam are caused to enter the optical-information storage medium 1 in such a manner as to be superimposed on each other. As a result, an interference-fringe pattern is formed inside the storage medium. Writing this pattern into the storage medium allows the recording of the information therein. Also, by shifting the position of the objective lens 510 or the optical block 521 along the driving direction 520, it becomes possible to change the incident angle of the reference beam which is to enter the optical-information storage medium 1. This feature allows implementation of the recording based on the angle multiplexing.

When reproducing the information recorded into the optical-information storage medium 1, as described earlier, the reference beam is guided to enter the optical-information storage medium 1. Moreover, the reference beam, which has passed through the optical-information storage medium 1, is reflected by a galvanometer mirror 516. In this way, a reproduction-use reference beam is generated. Furthermore, a reproduced beam, which is reproduced by this reproduction-use reference beam, propagates through the objective lens 510 and the angle filter 509. After that, the reproduced beam passes through the polarization beam splitter 507, then entering an optical detector 518. In this way, the recorded signal can be reproduced.

Even when the optical system illustrated in FIG. 5 is used where the signal beam and the reference beam are caused to enter one and the same objective lens, it is also possible to make the high-speed judgment on the boundary between the prerecorded area and the unrecorded area of the optical-information storage medium as illustrated in FIG. 1. Moreover, it is also possible to perform the high-speed positioning of the pickup at the recorded hologram as illustrated in FIG. 14.

According to the third embodiment explained so far, the configuration is employed where the signal beam and the reference beam are caused to enter one and the same objective lens. This feature makes it possible to provide the optical-information reproducing apparatus which exhibits an advantage of being capable of being tremendously downsized as compared with the optical configuration illustrated in FIG. 3.

Embodiment 4

Next, referring to the accompanying drawings, the explanation will be given below concerning a fourth embodiment of the present invention. The configuration of the optical-information reproducing apparatus in the fourth embodiment is basically the same as the one in the first embodiment. Accordingly, the explanation thereof will be omitted here.

Figure 10A:
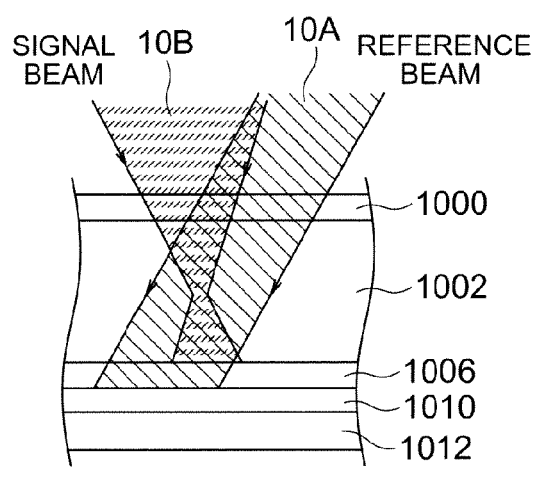
FIGS. 10A and 10B are schematic diagrams for illustrating an embodiment of the layer structure of the optical-information storage medium which is equipped with a reflection layer.
Figure 10B:
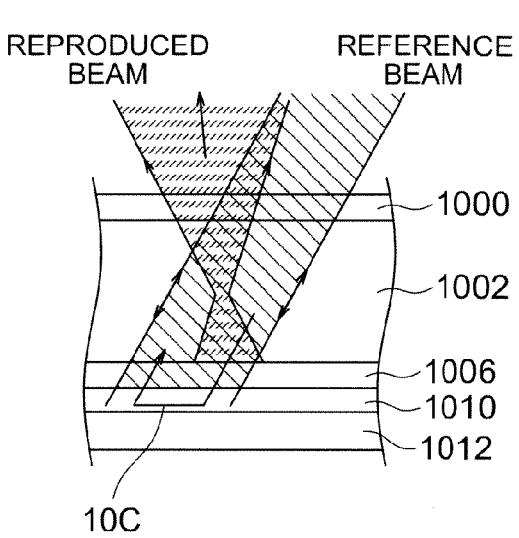

FIGS. 10A and 10B are diagrams for illustrating the layer structure of the optical-information storage medium which is equipped with a reflection layer. FIG. 10A indicates a state where information is recorded into the optical-information storage medium. FIG. 10B indicates a state where the information is reproduced from the optical-information storage medium.

The optical-information storage medium 1 includes, from the side of the pickup 11, a transparent cover layer 1000, a recording layer 1002, a light-absorption/light-transmission layer 1006, a light reflection layer 1010, and a third transparent protection layer 1012. The interference pattern between a reference beam 10A and a signal beam 10B is recorded into the recording layer 1002.

The physical property of the light-absorption/light-transmission layer 1006 is converted as follows: Namely, at the time of recording information, the layer 1006 absorbs the reference beam 10A and the signal beam 10B, whereas, at the time of reproducing the information, it permits the reference beam 10A to pass therethrough. For example, applying a voltage to the optical-information storage medium 1 gives rise to a change between the color-tinted state and the color-diminished state of the light-absorption/light-transmission layer 1006. Namely, at the time of recording information, the light-absorption/light-transmission layer 1006 falls into the color-tinted state, thereby absorbing the reference beam 10A and the signal beam 10B which have passed through the recording layer 1002; whereas, at the time of reproducing the information, the layer 1006 falls into the color-diminished state, thereby permitting the reference beam 10A to pass therethrough. Moreover, the reference beam 10A, which has passed through the light-absorption/light-transmission layer 1006, is reflected by the light reflection layer 1010, thereby becoming a reproduction-use reference beam 10C.

Also, WO3 as an electro chromic (: EC) material is employable as the light-absorption/light-transmission layer 1006.

Applying a voltage to this material gives rise to the reversible change between the color-tinted state and the color-diminished state. Namely, at the time of recording information, the layer 1006 is caused to fall into the color-tinted state, thereby absorbing the beams; whereas, at the time of reproducing the information, the layer 1006 is caused to fall into the color-diminished state, thereby permitting the beam to pass therethrough.

The optical-information storage medium illustrated in FIGS. 10A and 10B are usable for the pickup illustrated in FIG. 3 and FIG. 5 in which the reproduction-use-reference-beam optical system is omitted.

Even when the optical-information storage medium illustrated in FIG. 10 is used, it is also possible to make the high-speed judgment on the boundary between the prerecorded area and the unrecorded area of the optical-information storage medium as illustrated in FIG. 1. Moreover, it is also possible to perform the high-speed positioning of the pickup at the recorded hologram as illustrated in FIG. 14.

According to the fourth embodiment explained so far, the reproduction-use-reference-beam becomes unnecessary. This feature makes it possible to provide the optical-information reproducing apparatus that is small-sized.

Also, the above-described embodiments can be translated as follows: Namely, the following configuration is also allowable, of course: An optical-information reproducing apparatus for reproducing information from an optical-information storage medium where an interference pattern between a signal beam and a reference beam is recorded as page data by being angle-multiplexed, the optical-information reproducing apparatus, including a light-source for generating the reference beam, an angle-controlling element for controlling an angle into a direction which is perpendicular to the angle-multiplexed direction, the reference beam being guided to enter the optical-information storage medium at the angle, and an optical detector for detecting a reproduced image which is reproduced by the reference beam, wherein the reproduction of the page data is controlled in correspondence with an output from the optical detector.

Incidentally, the present invention is not limited to the above-described embodiments, but includes various modified embodiments. For example, the above-described embodiments have been explained in detail in order to explain the present invention in an easy-to-understand manner. Namely, the embodiments are not necessarily limited to the ones which are equipped with all of the configurations explained. Also, a partial portion of the configuration of a certain embodiment can be replaced by the configuration of another embodiment. Also, the configuration of another embodiment can be added to the configuration of a certain embodiment. Also, the addition, deletion, and replacement of the configuration of another embodiment can be performed with respect to a partial portion of the configuration of each embodiment.

Also, a partial portion or the entire portion of the above-described components such as each configuration, each function, each processing unit, and each processing method may also be implemented using hardware such as, e.g., designing the partial portion or the entire portion using integrated circuits. Also, the above-described components such as each configuration and each function may also be implemented using software by processor's interpreting and executing the program for implementing each function. The information about each-function-implementing program, table, and file can be stored into a recording apparatus such as memory, hard disc, SSD (: Solid State Drive), or a recording medium such as IC card, SD card, and DVD.

Also, the control lines and information lines specified are limited to the ones which are conceivable as being necessary when seen from the explanation's point-of-view. Namely, all of the control lines and information lines are not necessarily specified when seen from the product's point-of-view. It is also allowable to consider that, actually, almost all of the configurations are connected to each other.

The invention claimed is:

1. An optical-information reproducing apparatus for reproducing information from an optical-information storage medium where an interference pattern between a signal beam and a reference beam is recorded as page data by being angle-multiplexed, said optical-information reproducing apparatus, comprising:
a light-source for emitting a light beam;
an optical element for splitting said light beam into said reference beam and said signal beam;
an angle-controlling element for controlling said reference beam into a direction which is perpendicular to an angle-multiplexed direction, said reference beam being guided to enter said optical-information storage medium;
an optical detector for detecting a reproduced image which is reproduced by said reference beam; and
a position-controlling circuit for controlling position relationship between said reference beam and said optical-information storage medium, wherein,
said optical-information storage medium is illuminated with said reference beam in a state where angle of said reference beam is shifted from an angle which is suitable for said reproduction of said page data, said angle of said reference beam being directed to said direction which is perpendicular to said angle-multiplexed direction,
light amount of said reproduced beam reproduced from said optical-information storage medium being detected by said optical detector, and
presence or absence of a hologram at a position which is illuminated with said reference beam being detected based on information about said light amount detected.

2. The optical-information reproducing apparatus according to claim 1, wherein
said position is judged to be a hologram-unrecorded area if said light amount is smaller than a predetermined threshold value, said position being judged to be a hologram-prerecorded area if said light amount is larger than said predetermined threshold value.

3. The optical-information reproducing apparatus according to claim 1, wherein
said light amount is detected while changing said position relationship between said reference beam and said optical-information storage medium by using said position-controlling circuit,
a position at which said light amount becomes its peak being then judged to be central position of said hologram recorded.

4. An optical-information reproducing method for reproducing information from an optical-information storage medium where a hologram is recorded by being angle-multiplexed, and by taking advantage of holography using a signal beam and a reference beam,
said optical-information reproducing method, comprising the steps of:
shifting angle of said reference beam from an angle which is suitable for reproduction of a reproduced image, said optical-information storage medium being illuminated with said reference beam, said angle of said reference beam being directed to a direction which is perpendicular to an angle-multiplexed direction;
detecting light amount of said reproduced beam reproduced from said optical-information storage medium; and
detecting presence or absence of a hologram at a position based on information about said light amount detected, said position being illuminated with said reference beam.

5. An optical-information recording/reproducing apparatus for recording/reproducing information into/from an optical-information storage medium where an interference pattern between a signal beam and a reference beam is recorded as page data by being angle-multiplexed,
said optical-information recording/reproducing apparatus, comprising:
a light-source for emitting a light beam;
an optical element for splitting said light beam into said reference beam and said signal beam;
an angle-controlling element for controlling said reference beam into a direction which is perpendicular to an angle-multiplexed direction, said reference beam being guided to enter said optical-information storage medium;
an optical detector for detecting a reproduced image which is reproduced by said reference beam;
a spatial light modulator for modulating said signal beam into said page data; and
a position-controlling circuit for controlling position relationship between said reference beam and said optical-information storage medium, wherein,
said optical-information storage medium is illuminated with said reference beam in a state where angle of said reference beam is shifted from an angle which is suitable for said reproduction of said page data, said angle of said reference beam being directed to said direction which is perpendicular to said angle-multiplexed direction,
light amount of said reproduced beam reproduced from said optical-information storage medium being detected by said optical detector,
terminal end of a prerecorded area of said optical-information storage medium being detected based on information about said light amount detected, and
an additional writing being performed from an unrecorded area which is adjacent to said terminal end detected.

6. An optical-information reproducing method for reproducing information from an optical-information storage medium where a hologram is recorded by being angle-multiplexed, and by taking advantage of holography using a signal beam and a reference beam,
said optical-information reproducing method, comprising the steps of:
shifting angle of said reference beam from an angle which is suitable for reproduction of a reproduced image, said optical-information storage medium being illuminated with said reference beam, said angle of said reference beam being directed to a direction which is perpendicular to an angle-multiplexed direction;
detecting light amount of said reproduced beam reproduced from said optical-information storage medium;
detecting terminal end of a prerecorded area of said hologram at a position based on information about said light amount detected, said position being illuminated with said reference beam; and
performing an additional writing from an unrecorded area which is adjacent to said terminal end detected.

7. An optical-information reproducing apparatus for reproducing information from an optical-information storage medium where an interference pattern between a signal beam and a reference beam is recorded as page data by being angle-multiplexed,
said optical-information reproducing apparatus, comprising:
a light-source for generating said reference beam;
an angle-controlling element for controlling an angle into a direction which is perpendicular to an angle-multiplexed direction, said reference beam generated being guided to enter said optical-information storage medium at said angle; and
an optical detector for detecting a reproduced image which is reproduced by said reference beam, wherein said reproduction of said page data is controlled in correspondence with an output from said optical detector.

* * * * *

UNITED STATES PATENT AND TRADEMARK OFFICE
CERTIFICATE OF CORRECTION

| | |
|---|---|
| PATENT NO. | : 8,699,311 B2 |
| APPLICATION NO. | : 13/679644 |
| DATED | : April 15, 2014 |
| INVENTOR(S) | : Ishii |

Page 1 of 1

It is certified that error appears in the above-identified patent and that said Letters Patent is hereby corrected as shown below:

ON THE TITLE PAGE:

Item [72] should read Toshiki Ishii

Item [73] should read Hitachi Consumer Electronics Co., Tokyo (JP)

Signed and Sealed this
Fourteenth Day of October, 2014

Michelle K. Lee
*Deputy Director of the United States Patent and Trademark Office*